United States Patent Office 3,050,842
Patented Aug. 28, 1962

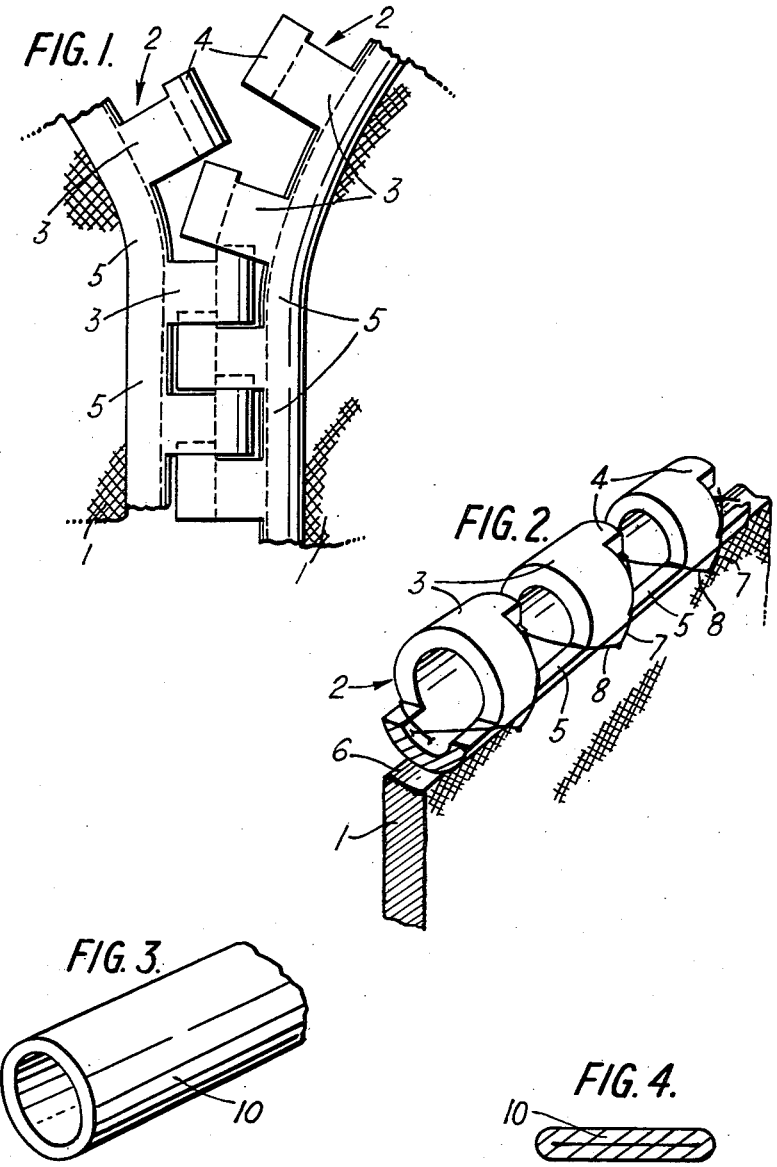

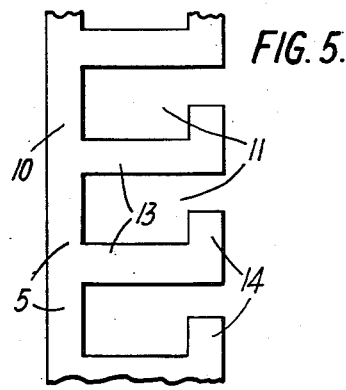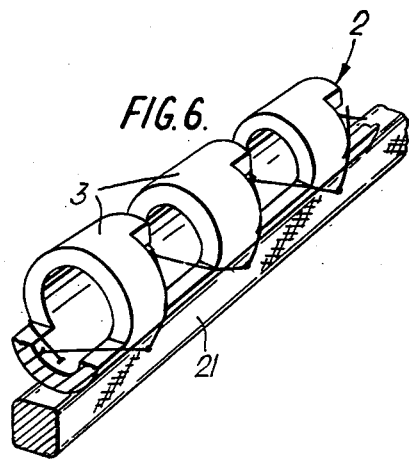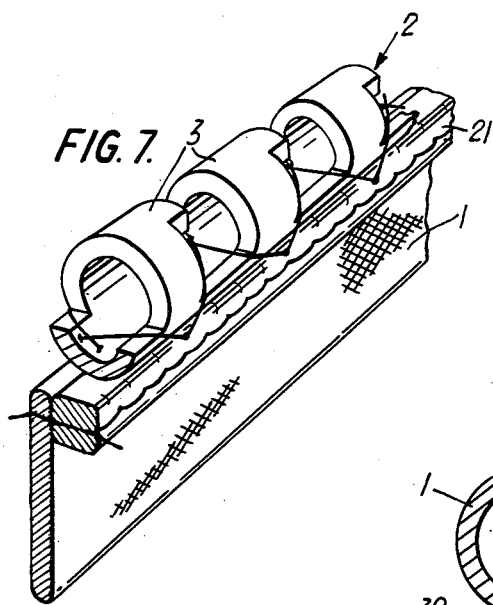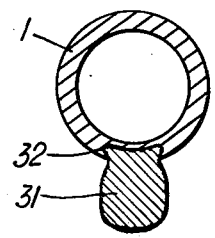

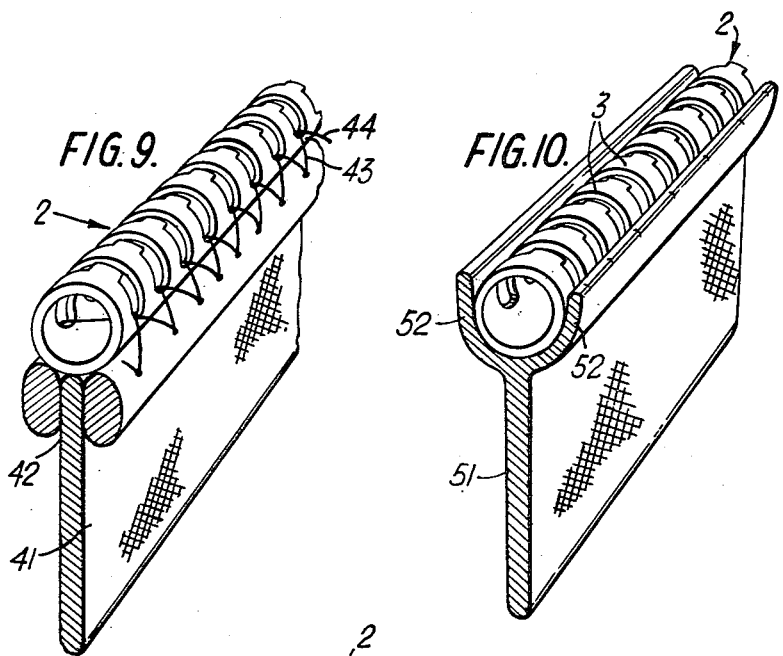
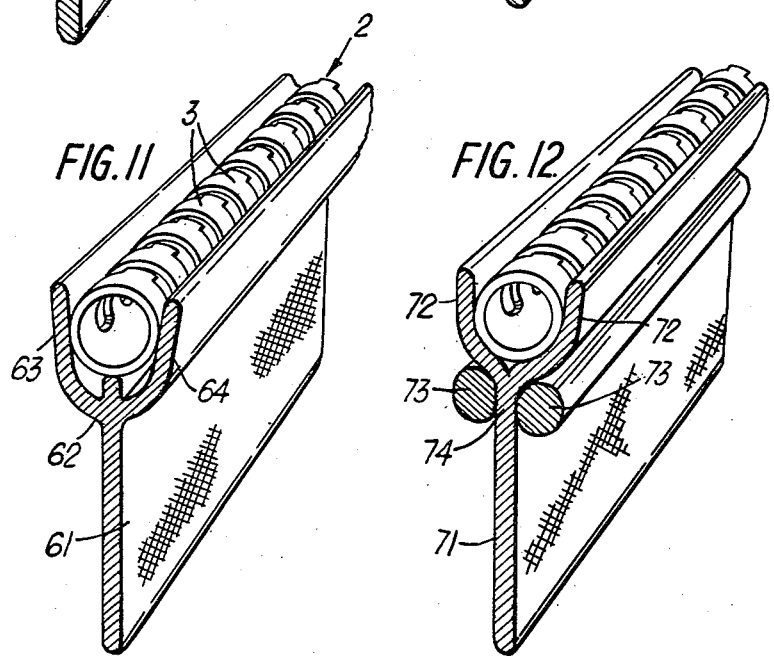

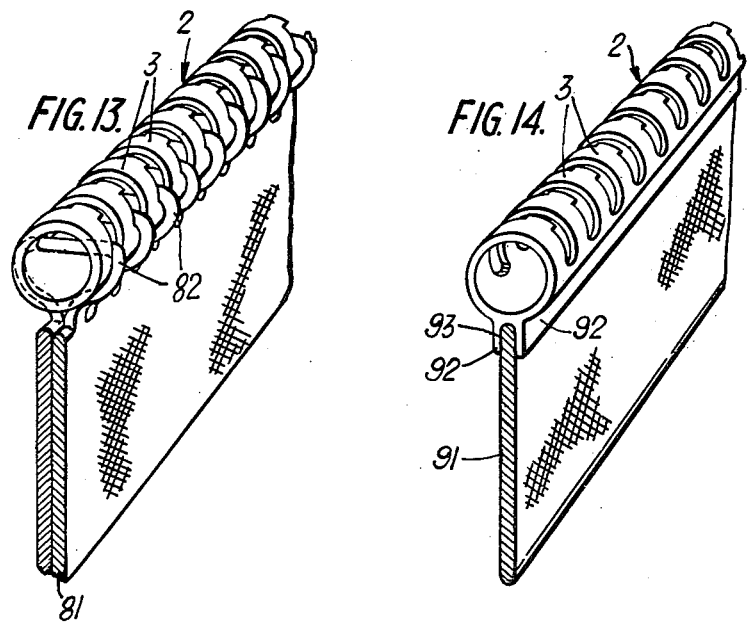
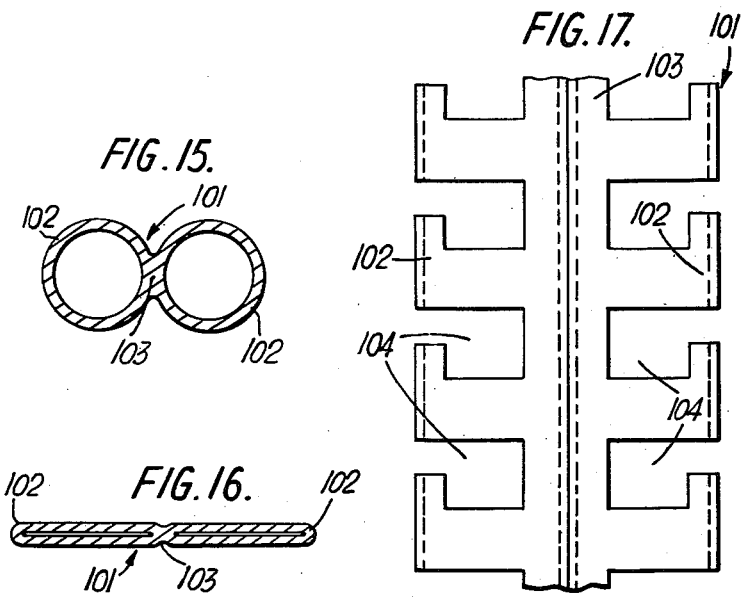

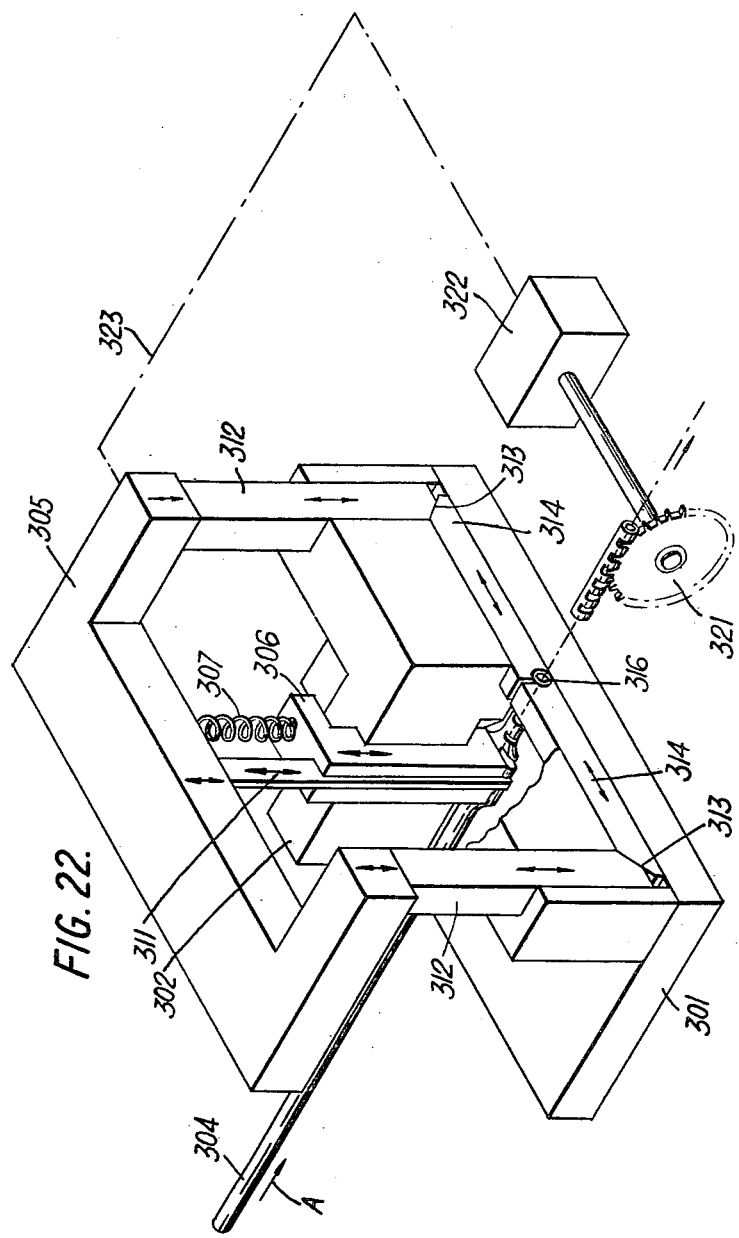

3,050,842
METHODS OF MAKING SLIDING CLASP
FASTENERS
Herbert Evans, Cardiff, Wales, assignor to Flex Fasteners Limited, Dinas, Rhondda, Glamorgan, Great Britain, a company of Great Britain
Filed Aug. 13, 1958, Ser. No. 754,747
Claims priority, application Great Britain Aug. 30, 1957
7 Claims. (Cl. 29—410)

The invention relates to sliding clasp fasteners.

It is an object of the invention to provide a method of making sliding clasp fasteners which is simple and easy to perform.

It is a further object of the invention to provide simple methods for simultaneously manufacturing two strings of interlocking members for attachment to two tapes, cords or similar carriers for a sliding clasp fastener.

These and other objects and advantages of the invention will become apparent to those skilled in the art from the following detailed description of the invention when read in conjunction with the accompanying drawings, which are given by way of example and in which:

FIG. 1 illustrates a portion of a sliding clasp fastener of the invention, in plan view;

FIG. 2 illustrates a portion of a string of interlocking members attached to a tape, in perspective view;

FIG. 3 illustrates a tube portion for use in the manufacture of a string of interlocking members of the fastener of FIGS. 1 and 2;

FIG. 4 illustrates a cross section through the tube portion of FIG. 3 after it has been flattened;

FIG. 5 illustrates a flattened tube portion provided with cut outs;

FIG. 6 is similar to FIG. 2, the string being however sewn to a cord;

FIG. 7 shows the string of interlocking members and the cord attached to a tape;

FIG. 8 illustrates the string moulded to the cord;

FIG. 9 illustrates a modified tape attached to a string of interlocking members;

FIG. 10 illustrates a string of interlocking members attached to a two branch tape;

FIG. 11 illustrates a string of interlocking members attached to a three branch tape;

FIG. 12 illustrates an embodiment having a tape with beadings added thereto;

FIG. 13 illustrates a string of interlocking members attached to a ladder like tape;

FIG. 14 illustrates a string of interlocking members provided with ribs;

FIG. 15 illustrates a twin tube in transverse section;

FIG. 16 illustrates the twin tube of FIG. 15 flattened;

FIG. 17 shows, in plan view, the flattened twin tube provided with cut outs;

Figure 18:
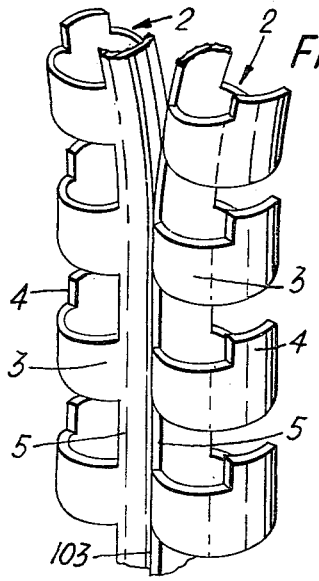
FIG. 18 illustrates two connected strings of interlocking members obtained from the twin tube.
Figure 19:
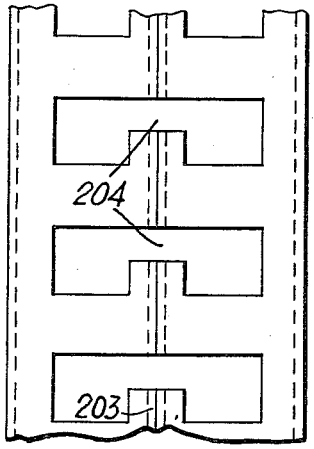
Figure 20:
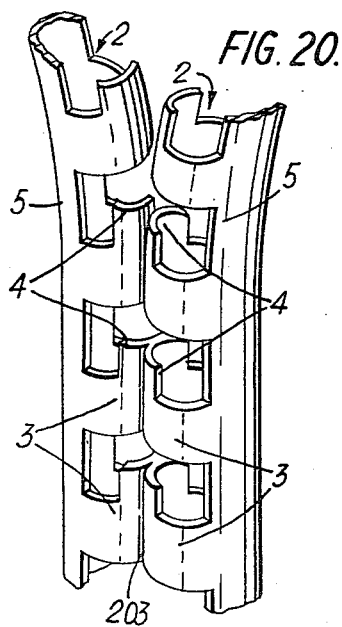
Figure 21:
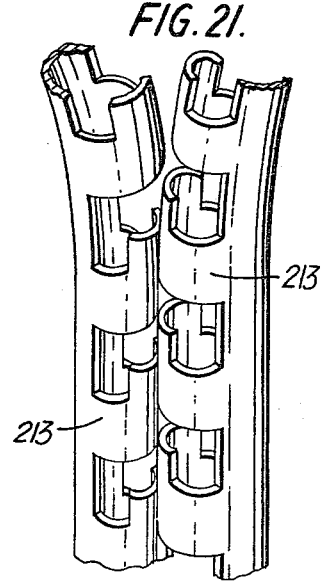

FIGS. 19 and 20 correspond respectively to FIGS. 17 and 18 and illustrate a different shape of cut outs in a twin tube;

FIG. 21 illustrates a further modification; and

FIG. 22 diagrammatically illustrates a device for use in the manufacture of sliding clasp fasteners.

The sliding clasp fastener illustrated in FIGS. 1 and 2 comprises two carrier tapes 1 each carrying a string 2 of interlocking members 3 of a closed ring-like shape. Each ring-like member 3 of each tape has a coupling element 4 which engages the hollow interior of a corresponding interlocking member of the respective other tape when the fastener is closed. Adjacent ring-like members 3 of each tape 1 are joined together by bridge pieces 5 between them, which define the distances between adjacent members 3 and facilitate the attachment of the string 2 to the respective tape 1. Preferably, the strings 2 are made of a resilient material that is capable of being moulded or extruded, such as nylon or other plastic material. The ring-like members 2 need not be circular as shown but may be elliptical, oval or of any other suitable closed configuration.

It is not necessary for each of the two tapes 1 to carry a string 2 of connected ring-like interlocking members 2. If desired, the interlocking members of one of the two tapes may be of any other suitable known construction.

The string 2 of ring-like interlocking members 3, when made of nylon or other plastic material may be made from a tube 10 (see FIG. 3) of such material. At least a portion of the tube 10 is temporarily pressed flat as shown in FIG. 4, and while the tube portion is flat, portions of the tube walls are punched or cut out or otherwise removed as shown in FIG. 5 at 11. When subsequently the pressure on the tube portion 10 is released, the tube portion returns to its tubular shape owing to its inherent resiliency or is, by suitable lateral pressure, caused to return to its tubular shape shown in FIG. 2, the remaining portions 13 of FIG. 5 corresponding to the rings 3 of FIG. 2, the projections 14 of FIG. 5 to the coupling elements 4 of FIG. 2 and the parts 15 of FIG. 5 to the bridge pieces 5 of FIG. 2.

As shown in FIG. 2, the string 2 of interlocking members 3 is attached to an edge 6 of the tape 1 by sewing, two threads 7 and 8 being used which cross each other at the bridge pieces 5 and the tape edge 6.

Alternatively, the string 2 of interlocking members 3 may be attached to a cord 21 or braid or similar support by sewing (see FIG. 6), the cord 21 or the like being subsequently sewn to the tape 1 (see FIG. 7).

As shown in FIG. 8, a cord 31 or the like may be directly united to the tube 1 from which the string is to be made by moulding it into the tube 1 at 32, for example while the tube 1 is being formed by extrusion.

In the embodiment of FIG. 9, the tape 41 has a beaded edge 42 which is sewn by threads 43 and 44 to the string 2.

As shown in FIG. 10, the tape 51 has two tape branches 52, the string 2 of connected interlocking members 3 being nested between the two branches 52 and fixed in position, for example by gluing.

The tape 61 of FIG. 11 has three tape branches 62, 63, and 64 the string 2 of connected interlocking members 3 being superimposed on the centre branch 62 and nested between the two outer branches 63 and 64, the string 2 being connected to the three branches, or at least to the centre branch, for example, by gluing.

As shown in FIG. 12, a tape 71 having a plurality of branches 72 is provided with beadings 73 at the region 74 where the branches 72 are joined together.

As shown in FIG. 13, the interlocking members 3 of the string 2 are passed through openings 82 of a ladder-like tape 81 which is bent about the bridge pieces of the string. Overlying parts of the tape 81 are connected together, for example by stitching, or gluing.

In the embodiment of FIG. 14, the string 2 of connected interlocking members 3 is provided with two adjacent ribs 92 which form a groove between them, the groove extending in the longitudinal direction of the string 2, the edge 93 of the tape 91 being introduced into the groove between the ribs 92 and fixed in the groove, for example by gluing or plastic welding or sewing. If desired, one of the ribs 92 may be omitted, the tape edge 93 being fixed to the remaining rib.

In a modified method of making strings of connected interlocking members, a twin tube 101 (FIG. 15) is used. The twin tube 101 is in cross-section of a shape somewhat similar to an 8 and has two tube parts 102 joined together by a centre part 103. The twin tube 101 is pressed flat as shown in FIG. 16; while flat, both tube parts are punched or otherwise cut as shown at 104 in FIG. 17 so that, as shown in FIG. 18, ring-like members 2 having coupling elements 4 are formed after the original tubular shape has been restored and are connected by bridge pieces 5, which are parts of the original centre part 103. The centre part 103 connects both strings as shown in the lower part of FIG. 18. Subsequently, as shown in the upper part of FIG. 19, the centre part 103 is longitudinally cut whereby two strings 2 of connected ring-like interlocking members 3 are obtained, one for each tape of a sliding clasp fastener.

Alternatively, the twin tube 101 while flat as in FIG. 16 may be cut as shown at 204 in FIG. 19. In this case the centre part, indicated in FIG. 19 by reference numeral 203 is non-continuous. After the pressure has been relieved and the original tubular shape of the twin tube restored, ring-like interlocking members are obtained (see FIG. 20), the remaining portions of the centre part 203 forming coupling elements 4. The interlocking members are connected by bridge pieces 5 at the sides of the twin tube remote from the centre part 203. As shown in the lower part of FIG. 20, the two portions of the punched twin tubes are connected by the remaining portions of the centre part 203, which are subsequently cut longitudinally as indicated in the upper part of FIG. 20. Thereby two strings 2 are obtained, one for each fastener tape.

As shown in FIGS. 18 and 20, the corresponding interlocking members 3 of each of the two strings 2 are formed at the same level of the original twin tube. However, as shown in FIG. 21, the twin tube may be punched so that corresponding interlocking members are staggered relatively to each other by half the pitch of adjacent interlocking members. This may assist in intermeshing the two strings of a twin tube in the course of the manufacture of a sliding clasp fastener.

The device of FIG. 22 for making a string of connected ring-like interlocking members comprises a base 301 carrying guide means 302 for a tube 304 of nylon or similar material. An actuator 305 is reciprocable in the direction towards and away from the base 301. A flattening shoe 306 is guided by the guide means 302 so as to be reciprocable in the same direction as the actuator 304. A spring 307 is inserted between the actuator 305 and the flattening shoe 306. The said shoe has a groove substantially perpendicular to the base 301. In the groove, a punch 311 is reciprocably mounted. By spring means (not shown) arranged between the punch 311 and the flattening shoe 306 the punch is urged away from the base 301 so as permanently to bear against the actuator 305. By spring means (not shown) arranged between the flattening shoe 306 and the guide means 302, the flattening shoe is permanently urged towards the actuator 305.

Through two bars 312 reciprocable perpendicularly to the base 301, the actuator 305 also acts on two slides 314 respectively which are reciprocable parallel to the base. The bars 312 and the slides 314 have co-operating inclined end faces 313. The slides 314 are recessed at adjacent end faces, the recesses forming a hole 316 for receiving the tube 304. A toothed wheel 321 is arranged to mesh with cut outs in the tube 304 and is rotatable in steps by a drive 322 which through a suitable link arrangement 323 reciprocates the actuator 305.

In operation, a tube 304 is threaded through the device until pre-formed recesses in the end of the tube mesh with the toothed wheel 321. The drive 322 rotates the toothed wheel 321 in steps. Thereby, the tube 304 is fed in steps through the device in the direction of the arrow A. While the tube 304 is at rest, the drive 322 through the link arrangement 323 causes the actuator 305 to perform one reciprocation. When the actuator moves towards the base it presses the punch 311 and, through the spring 307, the flattening shoe 306 bodily towards the base 301 until the flattening shoe 306 flattens the portion of the tube 304 encountered during such movement. When the said portion of the tube 304 has been pressed flat the flattening shoe 306 comes to rest. However, the spring 307 allows the actuator 305 to continue its movement towards the base 301. This causes the punch 311 to continue its movement although the flattening shoe 306 is at rest, and to punch the portion of the tube 304 while pressed flat. While the actuator moves towards the base, the slides 314 approach each other end exert a pressure against the previously punched wall portion of the tube 304 which lies within the hole 316. Thereby the said tube portion is assisted in substantially regaining its original cylindrical shape. Subsequently, the actuator 305, the punch 311 and the flattening shoe 306 recede from the base 301 and release the tube 304. After the punch 311 and the flattening shoe 306 have released the tube 304 they come to rest whereupon the drive 322 causes the toothed wheel 321 to perform one step, the toothed wheel pulling the tube forwards by one step. The device is now ready for a next cycle of operations.

It should be clearly understood that the expressions "flat" and "flattened" used in relation to a tube portion is intended to imply herein that superimposed walls of the tube portion lie everywhere close against each other, but is not intended to imply that the superimposed walls are necessarily plane.

Of course many further modifications, additions and omissions are possible without departing from the scope and spirit of the present invention.

I claim:

1. A method for use in the manufacture of sliding clasp fasteners, comprising the steps of providing a seamless tube of resilient plastic material, pressing opposite parts of the tube wall flat into direct contact with each other, removing portions of the tube wall parts while pressed flat into contact with each other, releasing the pressure to enable the tube wall parts to recede from each other, the removed tube wall portions being of such a shape that seamless rings remain after release of the pressure and the rings are provided with axially extending coupling elements and are inter-connected by part-cylindrical bridge pieces to form a string of inter-connected interlocking members, and attaching said string to a flexible carrier for a sliding clasp fastener.

2. A method as claimed in claim 1, wherein two continuous adjacent ribs are provided on the string of connected interlocking members which form a continuous groove between them, the groove extending in the longitudinal direction of the string, a tape edge being introduced into the said groove and fixed therein.

3. A method as claimed in claim 1, wherein after the pressure has been released, lateral pressure is applied against the wall parts in a direction at right angles to the direction of applying the first pressure to assist the wall parts in receding from each other.

4. A method as claimed in claim 1, wherein the tube is a twin-tube having two tubular parts tangentially merging into one another at a centre part of the twin tube, portions of the twin tube being punched out of the said twin-tube parts to form pairs of ring-like members on each side of the said centre part and to form coupling elements on said ring-like members, cutting longitudinally through said centre part after the pressure has been released to obtain two strings of interlocking members, and attaching each of said strings to a carrier of a sliding clasp fastener.

5. A method as claimed in claim 4, wherein after the pressure has been released lateral pressure is applied against the previously punched tube wall parts of the twin tube in a direction at right angles to the direction of applying the first pressure to assist the twin tube in regaining its original shape.

6. A method as defined in claim 4, wherein the punching is such that the coupling elements are formed at regions opposite the centre part, the ring-like members being inter-connected by portions adjacent the centre part.

7. A method as defined in claim 4, wherein the punching is such that the coupling elements are formed immediately adjacent the centre part which after punching is discontinuous, the ring-like members being inter-connected by bridge pieces at regions opposite the centre part.

References Cited in the file of this patent
UNITED STATES PATENTS

| | | |
|---|---|---|
| 156,162 | Jaques | Oct. 20, 1874 |
| 910,684 | Horner | Jan. 26, 1909 |
| 1,424,472 | Goldberg | Aug. 1, 1922 |
| 2,098,651 | Sundback | Nov. 9, 1937 |
| 2,133,092 | Gettig | Oct. 11, 1938 |
| 2,183,691 | Owens | Dec. 19, 1939 |
| 2,184,265 | Winterhalter | Dec. 19, 1939 |
| 2,220,221 | Dalton | Nov. 5, 1940 |
| 2,242,794 | Puschner et al. | May 20, 1941 |
| 2,262,881 | Boenecke | Nov. 18, 1941 |
| 2,539,372 | Metzler | Jan. 23, 1951 |
| 2,629,911 | Macy | Mar. 3, 1953 |